United States Patent
Andre et al.

(10) Patent No.: US 7,228,803 B2
(45) Date of Patent: Jun. 12, 2007

(54) GUIDE ASSEMBLY FOR GUIDE RAIL COMPRISING PAIR OF ANGLED GUIDE WHEELS

(75) Inventors: Jean-Luc Andre, Molsheim (FR); Jean-Louis Maupu, Villejuif (FR); Didier Ganter, Fegersheim (FR)

(73) Assignee: Lohr Industrie, Hangenbieten (FR)

(*) Notice: Subject to any disclaimer, the term of this patent is extended or adjusted under 35 U.S.C. 154(b) by 0 days.

(21) Appl. No.: 11/053,278

(22) Filed: Feb. 8, 2005

(65) Prior Publication Data

US 2005/0172851 A1 Aug. 11, 2005

(30) Foreign Application Priority Data

Feb. 9, 2004 (FR) .................................. 04 01236

(51) Int. Cl.
*B61B 12/02* (2006.01)
*B61C 11/00* (2006.01)
(52) U.S. Cl. .................................. 104/244; 105/72.2
(58) Field of Classification Search ............ 105/215.1; 104/106, 107, 110, 118, 120
See application file for complete search history.

(56) References Cited

U.S. PATENT DOCUMENTS

| 2,016,828 A | * | 10/1935 | Brownyer | ..................... 295/11 |
| 5,704,295 A | * | 1/1998 | Lohr | ......................... 105/72.2 |
| 5,960,717 A | * | 10/1999 | Andre | ........................ 104/139 |
| 6,363,860 B1 | * | 4/2002 | Andre | ........................ 105/72.2 |
| 6,488,324 B1 | * | 12/2002 | Ioannides et al. | .............. 295/7 |

FOREIGN PATENT DOCUMENTS

| FR | 2 780 739 A | 1/2000 |
| FR | 2 781 823 | 2/2000 |

\* cited by examiner

*Primary Examiner*—S. Joseph Morano
*Assistant Examiner*—Robert J. McCarry, Jr.
(74) *Attorney, Agent, or Firm*—Davis Bujold & Daniels, P.L.L.C.

(57) ABSTRACT

The flanged type guide wheel (1) or (2) has a peripheral edge (27) which has within its profile a recess (30), for example, a notch, the shape and position of which maintain the surface cover (28) of the guide wheel at a distance from the travel surface (8) or (9) that exists opposite it on the guide rail (4) when there is lateral force on the guide wheel. This invention has applications for guide assemblies for road vehicles used on guide rails.

19 Claims, 3 Drawing Sheets

GUIDE ASSEMBLY FOR GUIDE RAIL COMPRISING PAIR OF ANGLED GUIDE WHEELS

This application claims Priority from French Patent Application Serial No. 0401236 filed Feb. 9, 2004.

FIELD OF THE INVENTION

The invention relates to an angled guide wheel designed for a guide assembly with two identical guide wheels angled at a "V" moving along a guide rail.

BACKGROUND OF THE INVENTION

It is important that the guide assembly on a road vehicle that uses guide wheels to travel along a guide rail be stable, move without vibrating, and be as quiet as possible Wear and tear on the wheels must be controlled, with wheels being changed as seldom as possible, ideally, during periodic technical checkups.

In addition, primarily for safety reasons, the design of the guide assembly and the shape of the wheels and guide rail must serve to minimize any tendency to derailment and they should be designed to reduce and preferably compensate for any force which, if amplified, would lead to derailment.

Replacing worn out parts in the guide assembly should be accomplished quickly and simply.

However, exceptional force on the guide wheels and/or the arm of the guide assembly cannot be eliminated.

Furthermore, the contact surfaces of guide wheels are equipped with a covering that is generally glued or tightly fitted around the perimeter of the wheel rim. The covering is made of flexible material such as rubber or a similar material and is used to provide electrical and sound insulation between the wheel and the rail and to ensure smooth operation.

Thus, the necessity arises for an arrangement or a safety procedure whereby when exceptional lateral forces are exerted on the guide wheel, the contact between the wheel and the rail will be only steel against steel, with the covering used as the travel surface on the guide wheel still be maintained in place.

The present invention has precisely this objective and responds to the problem posed above.

SUMMARY OF THE INVENTION

To accomplish this, it uses a guide wheel paired with an identical guide wheel in an angled position at the end of a guide arm. The pair of guide wheels moves along the guide rail in order to guide a road vehicle.

More specifically, the guide wheel is a flanged wheel, that is, it has a peripheral or perimeter edge to block motion, said edge having a recessed portion on the interior, for example, a notch, in order to ensure that the contact between the wheel and the rail consists of only steel against steel when lateral force is exerted on the guide wheel or the guide arm.

Preventing contact between the covering on the guide wheel and the rail when lateral force is exerted keeps the covering from deteriorating prematurely and ensures that there is less wear on it.

BRIEF DESCRIPTION OF THE DRAWINGS

Other characteristics and features of he invention will be apparent from the following description, given by way of example, in conjunction with the accompanying drawings, wherein.

DESCRIPTION OF PREFERRED EMBODIMENT

Figure 1:
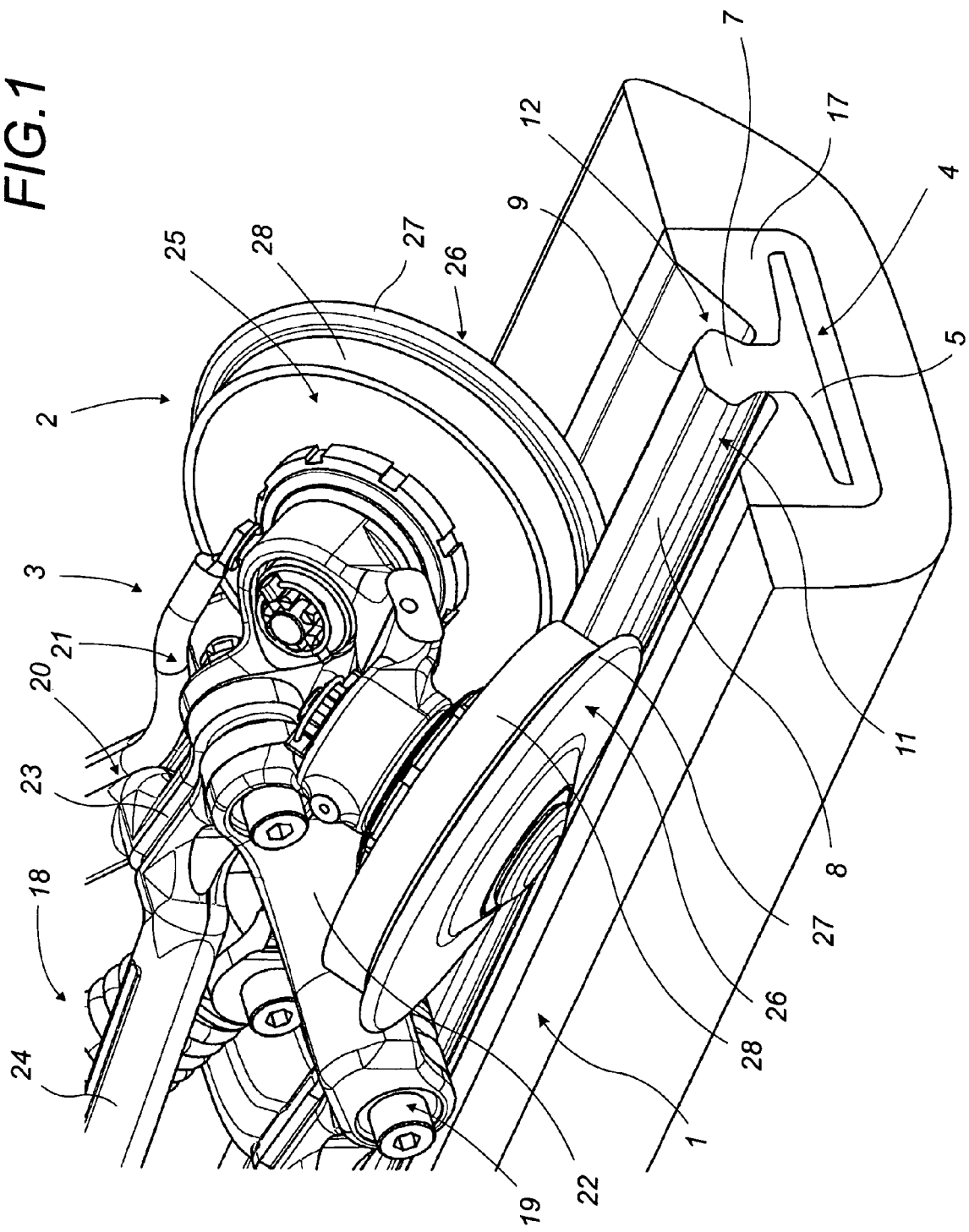
FIG. 1 is a perspective view of a guide assembly with two guide wheels angled at a V traveling along a guide rail.
Figure 2:
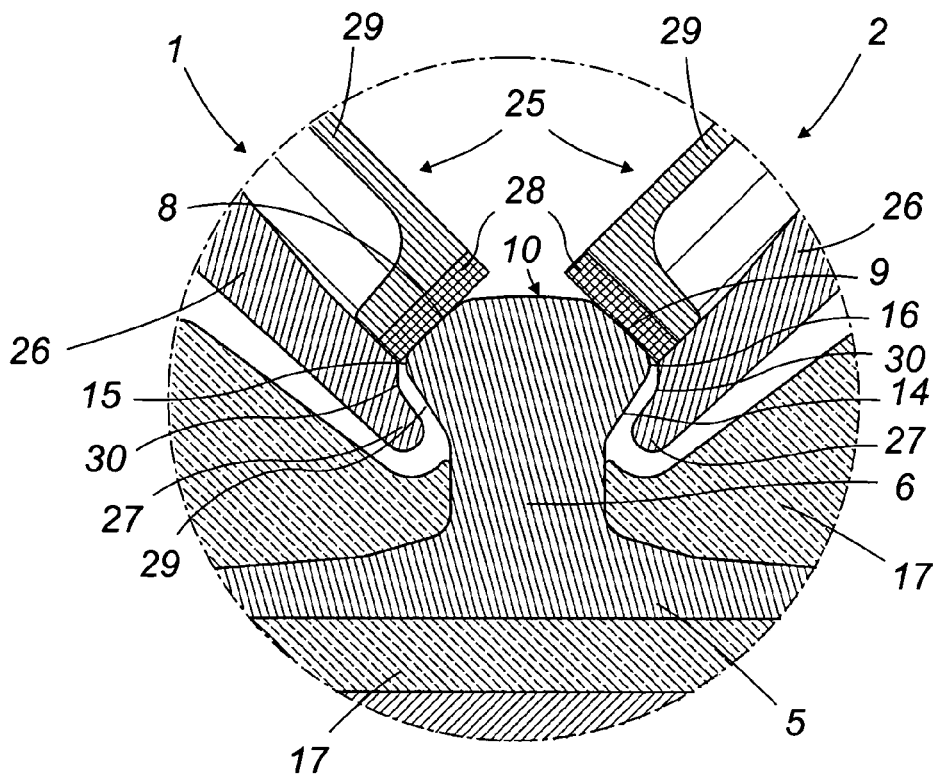
FIG. 2 is a transverse median cross-section at the level of the guide wheels on the guide assembly traveling along a guide rail.

The invention relates to an angled guide wheel 1 or 2, as well as a pair 1 and 2 of angled guide wheels forming a guide assembly, and to a guide rail adapted to said guide wheels.

As shown, these guide wheels are used in pairs angled at a V in a guide assembly 3 to travel along a guide rail 4 adapted to them.

This guide rail 4 has a bed 5, a core 6 and a rail head 7. On the latter portion there are two plane or slightly concave inclined travel pathways 8 or 9 along each of which a guide wheel 1 or 2 moves, respectively. The guide rail also has an upper table 10 and on either side, a projection 11 and 12 each formed of an inclined ramp 13 or 14, each extending into one of the corresponding travel pathways 8 or 9 following transitional rounded edge 15 and 16.

As indicated, the succession of travel pathway, rounded edge and corresponding inclined ramp each form one of the projecting sides 11 and 12 of guide rail 4. These projecting sides are the general characteristic shape of guide rails that are suitable for the invention.

Guide rail 4 is attached to the ground or immobilized in a mass 17 of synthetic material as shown in the drawings for purposes of electrical and sound insulation.

The guide wheels are attached to a guide assembly, one example of which, guide assembly 3, is described below. The invention is fairly independent of the type of guide assembly that supports the guide wheels. Therefore, the description of one embodiment of the latter is purely illustrative.

It generally comprises an articulated guide arm 18 having at least two branches. This guide arm 18 is connected to the directional control system of the vehicle. Guide arm 18 has one articulated extremity joining a pair of lower articulations 19 and 20 that pivot about a horizontal axle and an upper articulation 21 that pivots about an upper horizontal pivot axle connected first, to two connecting bearings 22 and 23 originating from the lower portion of arm 18, and second, to the upper element 24 of the arm, to which the two freely rotating angled guide wheels 1 and 2 are articulated.

Obviously, the articulated guide arm and more generally, the guide assembly 3, may be made in some other way.

Each guide wheel in the pair 1 and 2 of guide wheels is a flanged wheel, that is, it has on one side of its body a projecting peripheral edge designed to serve as a lateral motion stop and thus prevent the guide wheels from accidentally leaving the rail.

Next, one of the guide wheels will be described in detail, bearing in mind that the guide assembly always comprises two identical guide wheels arranged in a downward pointing V-shaped angle.

Each guide wheel is formed of a wheel rim 25 with a surrounding surface and a plate 26. These two pieces are connected by assembly and plate 26 has a larger diameter than wheel rim 25 so that a peripheral edge 27 projects beyond the surrounding surface to serve as a motion stop. The surrounding surface of wheel rim 25 is provided with a covering 28 used as a travel surface. Covering 28 is generally attached to the surface of the wheel rim by gluing it, tightening it, or in some other way. It is made of flexible, low-noise material and can be replaced on the rim either with or without dismantling the rim.

Wheel edge 25 is preferably hollow. Its body is formed of a casing type of piece 29 with a smooth, flat front surface made of flexible material.

In order to protect covering 28, it is desirable for there to be steel-to-steel contact between guide wheel 1 or 2 and the guide rail when exceptional lateral force pushes the guide wheel towards the guide rail.

Figure 3:
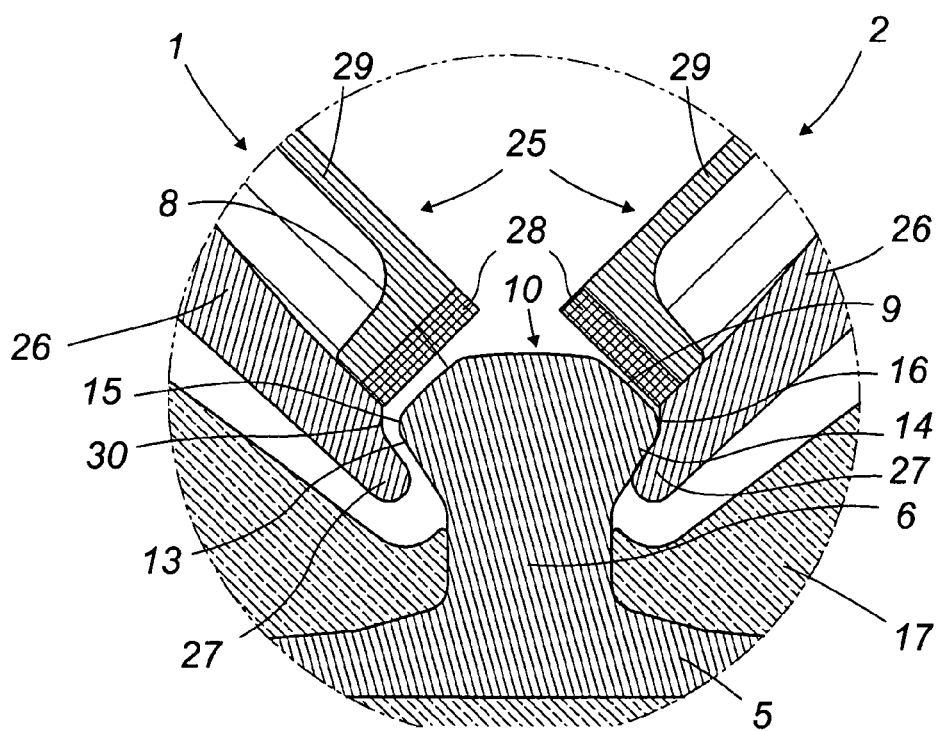
FIG. 3 is a transverse median cross-section at the level of the guide wheels on the guide assembly with abnormal force being exerted upon the right guide wheel in the drawing.
Figure 4:
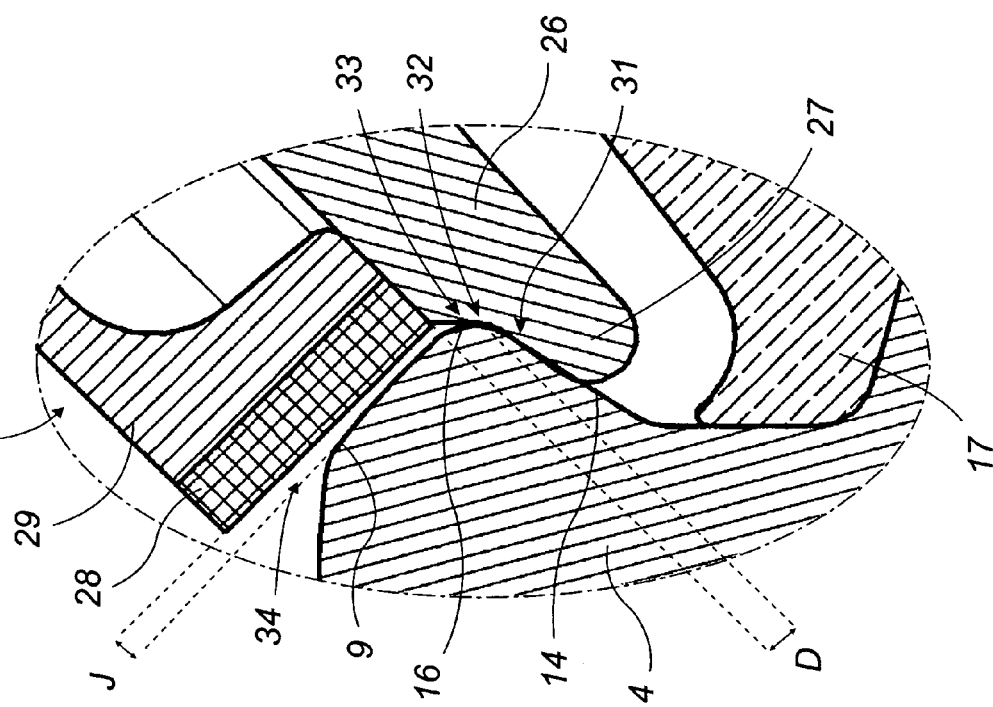
FIGS. 4 and 5 are each detailed cross-sections based upon FIG. 3 showing enlargements in FIG. 4, of the shape of the cut out portion, and in FIG. 5, the play between the rail and the covering on the guide wheel when exceptional lateral force is exerted.
Figure 5:
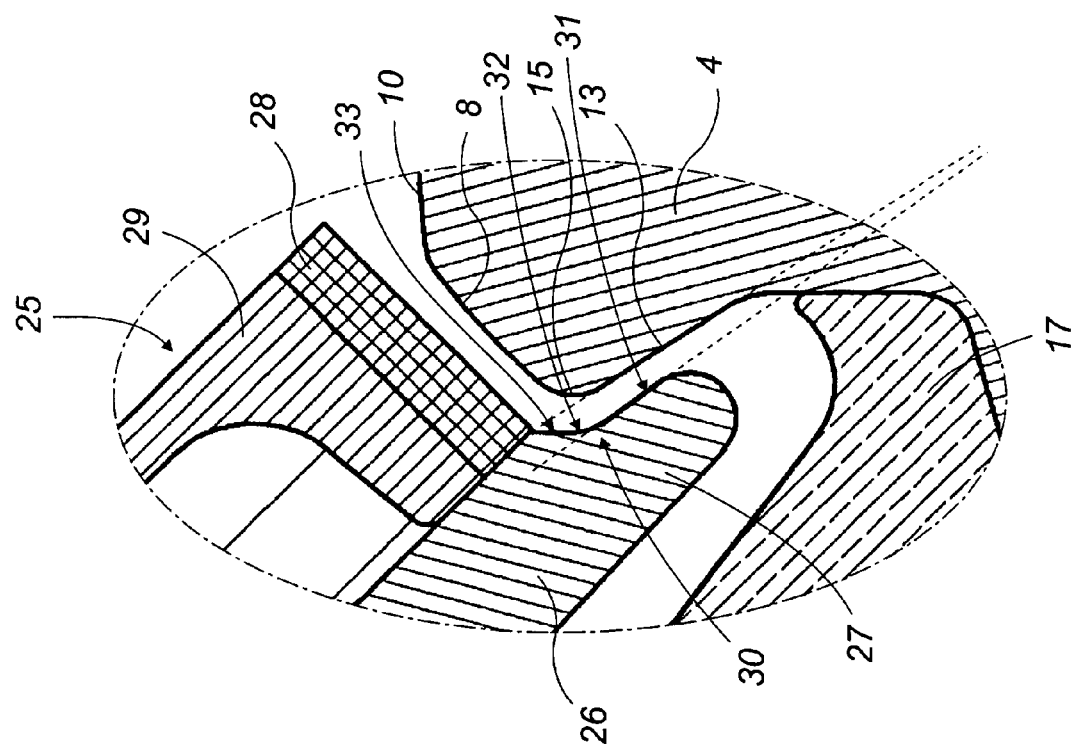

To achieve this, as shown in FIG. 3 and the enlargements in FIGS. 4 and 5, peripheral edge 27 has on the rail side a recessed portion 30, for example, a notch, forming an offset area within the interior surface of the edge relative to its normal extension.

The representation of this recess 30 shows that it is formed successively of the periphery of the guide wheel towards its interior, an oblique technical plane 31 sloping upward in relation to the external surface of plate 26, followed by a slightly rounded concave area 32 and then an upwardly inclined ramp 33 (FIGS. 4 and 5).

The upward slope of oblique technical plane 31 is equal to, close to, or greater than that of inclined ramp 13 or 14 opposite the rail. This characteristic is shown by the slightly converging broken lines in FIG. 4.

Because of the positioning and the shape of recess 30, when exceptional lateral force is exerted on the guide wheels and/or the guide assembly, it is possible first, for the interior surface of peripheral edge 27 to abut the opposing inclined ramp and the rounded portion of guide rail 4, and second, to consecutively wedge itself against rounded portion 15 or 16 and thereby create play 34, also referenced as J, between the exterior contact surface of covering 28 and corresponding pathway 8 or 9.

This play J prevents any contact between covering 28 with corresponding pathway 8 or 9 when there is exceptional lateral force. This protects the covering and preserves its integrity, preventing it from deteriorating or becoming destroyed.

The corresponding detailed view in FIG. 5 shows more specifically the position of the guide wheel in contact when there is exceptional force. In this drawing it can be seen that oblique technical plane 31 in recess 30 is laterally stopped by contact with the opposing inclined ramp 13 or 14 of the guide rail, that the concave rounded area 32 in recess 30 becomes wedged in that of the rail, and that the extremity toward rounded portion 32 of inclined ramp 33 of recess 30 serves as a depth stop to maintain minimal play J between the rail and the contact surface of the covering. The contact surface of covering 28 is then in the air in relation to the pathway on the rail 8 or 9 below, and the beginning of the covering shifts for distance D from rounded portion 15 or 16 of the guide rail to protect it further, as shown in FIG. 5 by two broken lines. All of this occurs because exceptional lateral forces cause the guide wheel to incline at a supplemental angle.

By increasing the slope of oblique technical plane 31 in relation to the external surface of plate 26, it is possible to increase this play J or 34, with its shape becoming a larger wedge or corner. Increasing play J is possible because of the clearance associated with functional play existing between the pieces at the level of the guide arm extremity and the guide wheel attachments to this guide arm.

The invention claimed is:

1. An inclined guide wheel for engaging with and being guided along a guide rail, the inclined guide rail comprising:
   a plate (26) having a projecting peripheral edge (27); and
   a wheel rim (25) secured to the plate (26), and the wheel rim (25) having a replaceable perimeter covering (28) for normally engaging with a travel path (8, 9) of a guide rail (4) as the inclined guide wheel travels along a guide rail without any lateral force being applied to the guide wheel;
   wherein the projecting peripheral edge (27) has a recess (30) on an inwardly facing surface thereof such that when a lateral force is applied to the guide wheel, the recess (30) engages with a projection of the guide rail and causes the covering (28) of the wheel rim (25) to interrupt contact with the travel path (8 or 9) of the guide rail (4) and to be spaced therefrom so as to avoid premature deterioration of the covering (28).

2. The inclined guide wheel according to claim 1, wherein the recess (30) is a notch.

3. The inclined guide wheel according to claim 1, wherein the recess (30), formed in the inwardly facing surface of the projecting peripheral edge (27), comprises an oblique technical plane (31) transitioning with a concave rounded portion (32), for cooperation with a rounded portion (15, 16) of the guide rail, which transitions with an inclined ramp (33), and the inclined ramp (33) has a greater angle than the oblique technical plane (31), and the oblique technical plane (31), the concave rounded portion (32) and the inclined ramp (33) form an obtuse angle.

4. The inclined guide wheel according to claim 3 in combination with the guide rail having a pair of opposed inclined ramps (13 or 14), wherein an upward slope of the oblique technical plane (31) is substantially the same as a slope of the inclined ramp (13 or 14) of the guide rail.

5. The inclined guide wheel according to claim 3 in combination with the guide rail having a pair of opposed inclined ramps (13 or 14), wherein an upward slope of the oblique technical plane (31) is greater than a slope of the inclined ramp (13 or 14) of the guide rail.

6. The inclined guide wheel according to claim 1, wherein the wheel rim (25) of the guide wheel is at least partially hollow and formed of a casing piece (29) with a smooth, flat exterior surface.

7. A pair of inclined guide wheels for engaging with and being guided along a guide rail, the pair of inclined guide wheels being rotatably supported by an guide arm (18), and each of the pair of inclined guide wheels comprising:
   a wheel rim (25) having a replaceable perimeter covering (28) for normally engaging with a travel path (8, 9) of a guide rail (4) as the inclined guide wheel travels along a guide rail without any lateral force being applied to the guide wheel;
   a plate (26) having a projecting peripheral edge (27) extending radially beyond an outer circumference of both the wheel rim (25) and the replaceable perimeter covering (28); and wherein the projecting peripheral edge (27) has a recess (30) on an inwardly facing surface thereof such that when a lateral force is applied to the guide wheel, the recess (30) of the guide wheel (1 or 2) compensating for the lateral force engages with a projection of the guide rail and causes the covering (28) of the wheel rim (25) of the guide wheel compensating for the lateral force to interrupt contact with the travel path (8 or 9) of the guide rail (4) and be spaced therefrom so as to avoid premature deterioration of the covering (28).

8. The pair of inclined guide wheels according to claim 7, wherein the recess (30) is a notch.

9. The pair of inclined guide wheels according to claims 7, wherein the recess (30), formed in the inwardly facing surface of the projecting peripheral edge (27) of each of the pair of guide wheels (1, 2), comprises an oblique technical plane (31) transitioning with a concave rounded portion (32), for cooperation with a rounded portion (15, 16) of the guide rail, which transitions with an inclined ramp (33), and the oblique technical plane (31), the concave rounded portion (32) and the inclined ramp (33) form an obtuse angle.

10. The pair of inclined guide wheels according to claim 9 in combination with the guide rail having a pair of opposed inclined ramps (13 or 14), wherein an upward slope of the oblique technical plane (31) is substantially the same as a slope of at least one of the inclined ramps (13 or 14) of the guide rail.

11. The pair of inclined guide wheels according to claim 9 in combination with the guide rail having a pair of opposed inclined ramps (13 or 14), wherein an upward slope of the oblique technical plane (31) is greater than a slope of at least one of the inclined ramps (13 or 14) of the guide rail.

12. The pair of inclined guide wheels according to claim 7, wherein the wheel rim (25) of the guide wheel is at least partially hollow and formed of a casing piece (29) with a smooth, flat exterior surface.

13. A guide assembly guiding a pair of guide wheels (1, 2) along a guide rail, the guide assembly comprising:
the guide rail comprising an upper plane table (10) and two projecting sides (11, 12) joining the upper plane table (10) with a base, each of the projecting sides (11, 12) comprising a travel pathway (8, 9) defining a substantially planar surface positioned normal to a radius of the respective engaging guide wheel (1, 2) extending away from and downwardly from the upper plane table (10) and being joined with an inclined ramp (13, 14) by a rounded portion (15, 16);
a guide arm (18) supporting the pair of guide wheels (1, 2), the pair of guide wheels (1, 2) being supported by the guide arm (18) in an angled downward oriented V position, and each of the pair of inclined guide wheels (1, 2) comprising:
a plate (26) having a projecting peripheral edge (27); and
a wheel rim (25) secured to the plate (26), and the wheel rim (25) having a replaceable perimeter covering (28) for normally engaging with the travel path (8, 9) of the guide rail (4) as the inclined guide wheel travels along the guide rail without any lateral force being applied to the guide wheel;
wherein the projecting peripheral edge (27) has a recess (30) on an inwardly facing surface thereof such that when a lateral force is applied to the guide wheel, the recess (30) of the guide wheel (1 or 2) compensating for the lateral force engages with one of the projecting sides (11, 12) of the guide rail and causes the covering (28) of the wheel rim (25) of the guide wheel compensating for the lateral force to interrupt contact with the travel path (8 or 9) of the guide rail (4) and be spaced therefrom so as to avoid premature deterioration of the covering (28).

14. The guide assembly according to claim 13, wherein the recess (30) is a notch.

15. The guide assembly according to claims 13, wherein the recess (30), formed in the inwardly facing surface of the projecting peripheral edge (27) of each of the pair of guide rails (1, 2), comprises an oblique technical plane (31) transitioning with a concave rounded portion (32), for cooperation with a rounded portion (15, 16) of the guide rail, which transitions with an inclined ramp (33), and the oblique technical plane (31), the concave rounded portion (32) and the inclined ramp (33) form an obtuse angle.

16. The guide assembly according to claim 15, wherein an upward slope of the oblique technical plane (31) is substantially the same as a slope of the inclined ramp (13 or 14) of at least one of the inclined ramps (13 or 14) of the guide rail.

17. The guide assembly according to claim 15, wherein an upward slope of the oblique technical plane (31) is greater than a slope of the inclined ramp (13 or 14) of at least one of the inclined ramps (13 or 14) of the guide rail.

18. The guide assembly according to claim 13, wherein the wheel rim (25) of the guide wheel is at least partially hollow and formed of a casing piece (29) with a smooth, flat exterior surface.

19. The guide assembly according to claim 13, wherein when the lateral force is applied to one of the pair of guide wheels, the covering (28) of the guide wheel compensating for the lateral force shifts a distance (D) relative to the guide rail.

* * * * *